(12) United States Patent
Hines et al.

(10) Patent No.: US 8,074,173 B2
(45) Date of Patent: Dec. 6, 2011

(54) ASSOCIATING INPUT WITH COMPUTER BASED CONTENT

(75) Inventors: Michael Frederick Hines, Sammamish, WA (US); Michael F. Koenig, Bellevue, WA (US); Tara Prakriya, Redmond, WA (US); Subha Bhattacharyay, Bellevue, WA (US); Anuraag Tiwari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 12/117,216

(22) Filed: May 8, 2008

(65) Prior Publication Data
US 2009/0282341 A1  Nov. 12, 2009

(51) Int. Cl.
*G06F 13/00* (2006.01)
*G06F 15/00* (2006.01)

(52) U.S. Cl. ........................ 715/731; 715/764

(58) Field of Classification Search .......... 715/741–744, 715/731–733, 762–765, 851–853
See application file for complete search history.

(56) References Cited

U.S. PATENT DOCUMENTS

| | | | |
|---|---|---|---|
| 6,104,317 A | 8/2000 | Panagrossi | |
| 6,452,615 B1 | 9/2002 | Chiu et al. | |
| 7,113,173 B1 | 9/2006 | Bi et al. | |
| 7,136,052 B1 | 11/2006 | Lam | |
| 7,137,076 B2 | 11/2006 | Iwema et al. | |
| 7,246,060 B2 | 7/2007 | Geidl et al. | |
| 2003/0076302 A1 | 4/2003 | Langstraat | |
| 2003/0095113 A1* | 5/2003 | Ma et al. | 345/175 |
| 2003/0122966 A1 | 7/2003 | Markman | |
| 2004/0223660 A1 | 11/2004 | Zank et al. | |
| 2005/0246622 A1 | 11/2005 | Ahn | |
| 2006/0227116 A1 | 10/2006 | Zotov et al. | |
| 2007/0233496 A1 | 10/2007 | Uen | |
| 2010/0174993 A1* | 7/2010 | Pennington et al. | 715/738 |

FOREIGN PATENT DOCUMENTS

| | | |
|---|---|---|
| JP | 09-101842 | 4/1997 |
| JP | 09-101842 A | 4/1997 |
| KR | 20020032202 | 5/2002 |
| KR | 20020032202 A | 5/2002 |
| KR | 10200525895 * | 3/2005 |
| KR | 20050025894 A | 3/2005 |

OTHER PUBLICATIONS

Written Opinion for PCT/US2009/039823 mailed Nov. 12, 2009.
International Search Report for PCT/US2009/039823 mailed Nov. 12, 2009.
"ThomasNet Industrial News Room", http://news.thomasnet.com/fullstory/507654.
"General Dynamics ltronix", http://www.gd-itronix.com/index.cfm?locale=en_US&page=Products:Duo-Touch.
European Search Report, Application Number: EP 09 74 3199.
PCT International Preliminary Search Report, Written Opinion, for PCT/US2009/039823, mailed May 8, 2008.

* cited by examiner

*Primary Examiner* — Cao "Kevin" Nguyen

(57) ABSTRACT

Notes and other input may be entered directly onto computer based content. The notes may be taken on a portable computing device that contains metadata from the computer based content. The metadata and input are stored and once the portable computing device is in communication with the second computing device displaying the computer based content, the input is displayed near the computer based content that was displayed at the time the input was created.

14 Claims, 4 Drawing Sheets

ASSOCIATING INPUT WITH COMPUTER BASED CONTENT

BACKGROUND

This Background is intended to provide the basic context of this patent application and it is not intended to describe a specific problem to be solved.

Communication through electronic means is becoming more common. Individuals, companies, and institutions often use electronic authoring tools in their communications, and are broadcasting these across the Internet. At the same time, users make notes on paper, and often on small, portable computing devices. The notes are usually related to the content being viewed. However, for a variety of reasons, the comments are separate from the original content and the application displaying the original content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of associating input on a portable computing device with computer based content on a second computing device is disclosed. Computer based content may be displayed on the second computing device. Input metadata may be communicated to the portable computing device where the input metadata may be metadata related to the computer based content. Data may be received from the portable computing device where the data may include input and input metadata. The input and input metadata may be created at an input point where the input point may be a point of progress of the computer based content at which the input was entered. The input metadata may be information related to the computer based content being displayed at the input point. The data from the portable computing device may be in a memory on the second computing device and the input metadata may be used to identify and display the input in a window on the second computing device at the input point in the computer based content.

As a result of the method, user interface and system, notes and other input may be entered into computer based content. The notes may be taken on a portable computing device that contains metadata from the computer based content. The metadata and input are stored and once the portable computing device is in communication with the second computing device displaying the computer based content, the input is displayed near the computer based content that was displayed at the time the input was created. Users can select the input and the computer based content will adjust to the input point in the content that was displayed when the input was created. The input may be edited or moved to another point in the computer based content.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
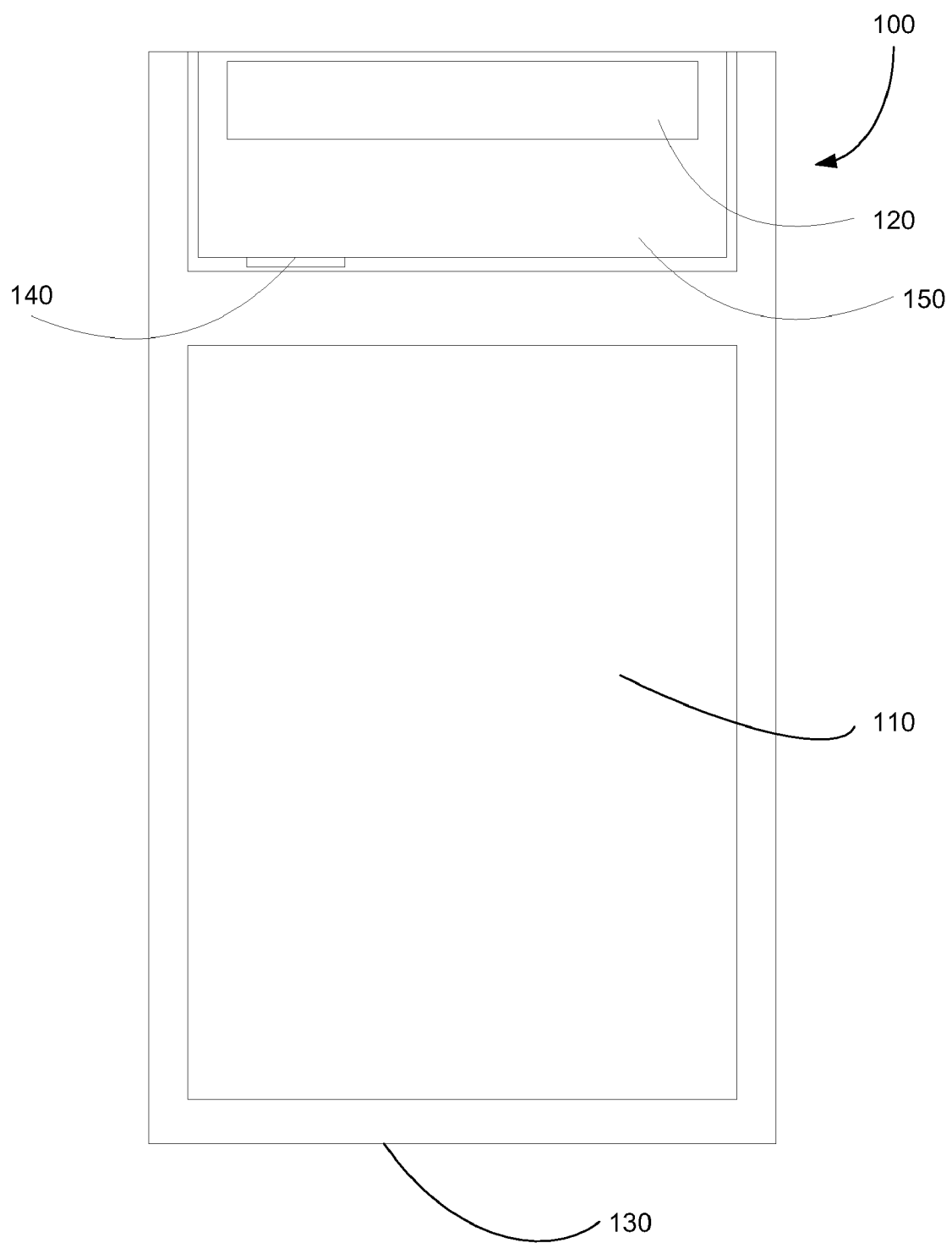
FIG. 1 is an illustration of a portable computing device.

FIG. 1 may be an illustration of a portable computing device 100. Portable computing devices 100 may be adapted to store and play a variety of file types such music files (for example, wav files, mp3 files, etc.), video files (for example, wav files, mpeg files, mpeg4 files, etc.), photo files (for example, jpeg, gif, etc.) or any other type of electronic data file. Music files are not just traditional music files but also may include podcasts, voice recordings, audio books, etc. The devices 100 may also have an FM radio, an AM radio, a satellite receiver or a TV tuner to receive broadcasts from a variety of sources. Additional features are certainly available such as a WiFi ability, ability to transmit music, photos or video to another device, ability to record voices, ability to take photos or videos, ability to make telephone calls, ability to accept GPS signals and calculate locations, ability to play video games, keep calendars, keep contacts, take notes, etc. The device 100 may an input area 110. The device 100 may also have a display 120.

In some embodiments, the device 100 may be separable into two portable devices. A first portable device 130 may include the input area 110 and an interface 140 for a second portable device 150. The second portable device 150 may contain a display 120 and an interface 140 to communicate with the first portable device 130. The second portable device 150 may contain a processor, the first portable device 130 may contain a processor or both may contain a processor.

Figure 2:
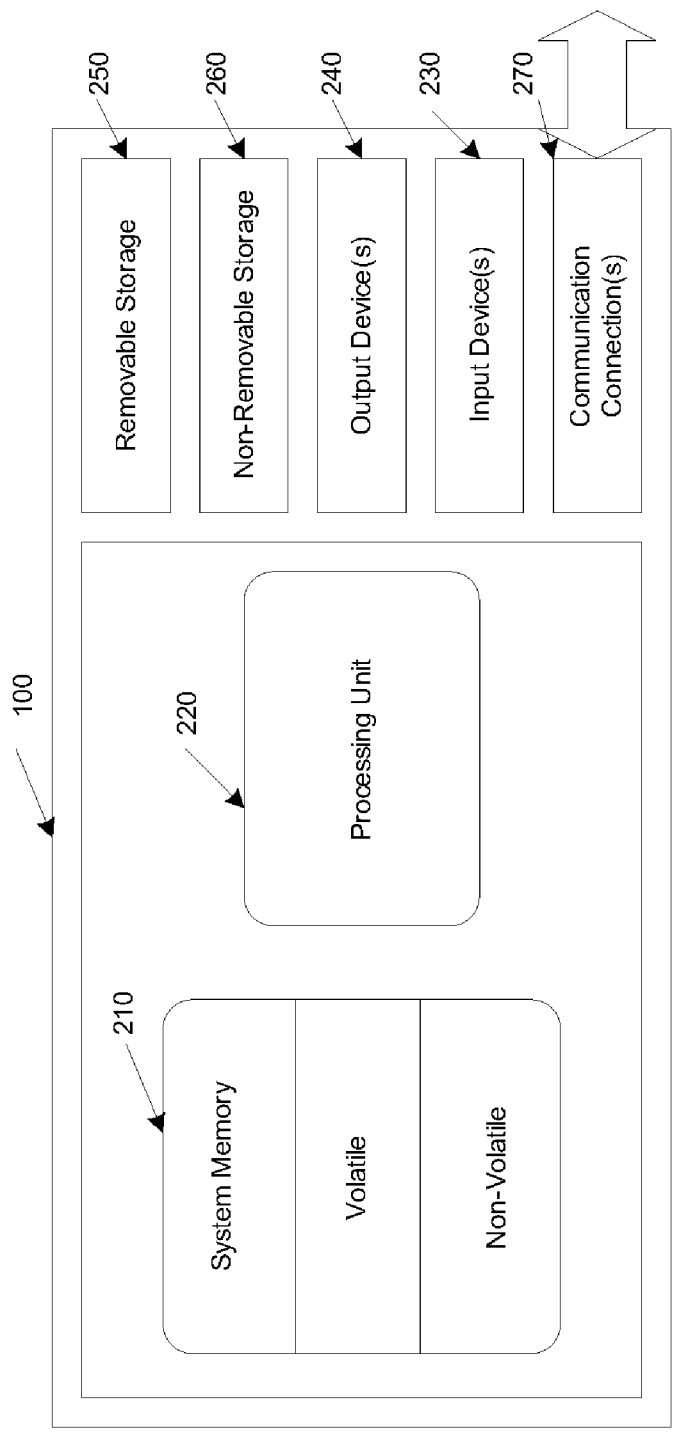
FIG. 2 is an illustration of a computing system.

FIG. 2 may be an illustration of the hardware used in the portable computing device 100. The device 100 may have a memory 210, a processing unit 220, an input area 230 such as the input area 110 (FIG. 1), an output device 240 such as a display 150 (FIG. 1) and a power source (not shown). The memory 210 may be volatile (such as RAM), non-volatile (such as ROM, flash memory, etc.) or some combination of the two.

The device 100 may also include additional storage (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 2 by removable storage 250 and non-removable storage 260. Computer storage media includes volatile and nonvolatile, removable and non-removable media implemented in any method or technology for storage of information such as computer readable instructions, data structures, program modules or other data. Memory 210, removable storage 250 and non-removable storage 260 are all examples of computer storage media. Computer storage media includes, but is not limited to, RAM, ROM, EEPROM, flash memory or other memory technology. Any such computer storage media may be part of device 100.

The processing unit 220 may be any processing unit 220 capable of executing computer code to decode data from a compressed format into a useable form fast enough such that music and video may be played continuously without skips or jumps. It may also be useful if the processor 220 is efficient in using power to increase the life of the power source. The device 100 may also contain communications connection(s) 270 that allow the device 100 to communicate with other devices. Communications connection(s) 270 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery, an input from a power converter or another portable power source. The display 120 may be a color LCD screen or other display type that fits inside the device 100.

Figure 3:
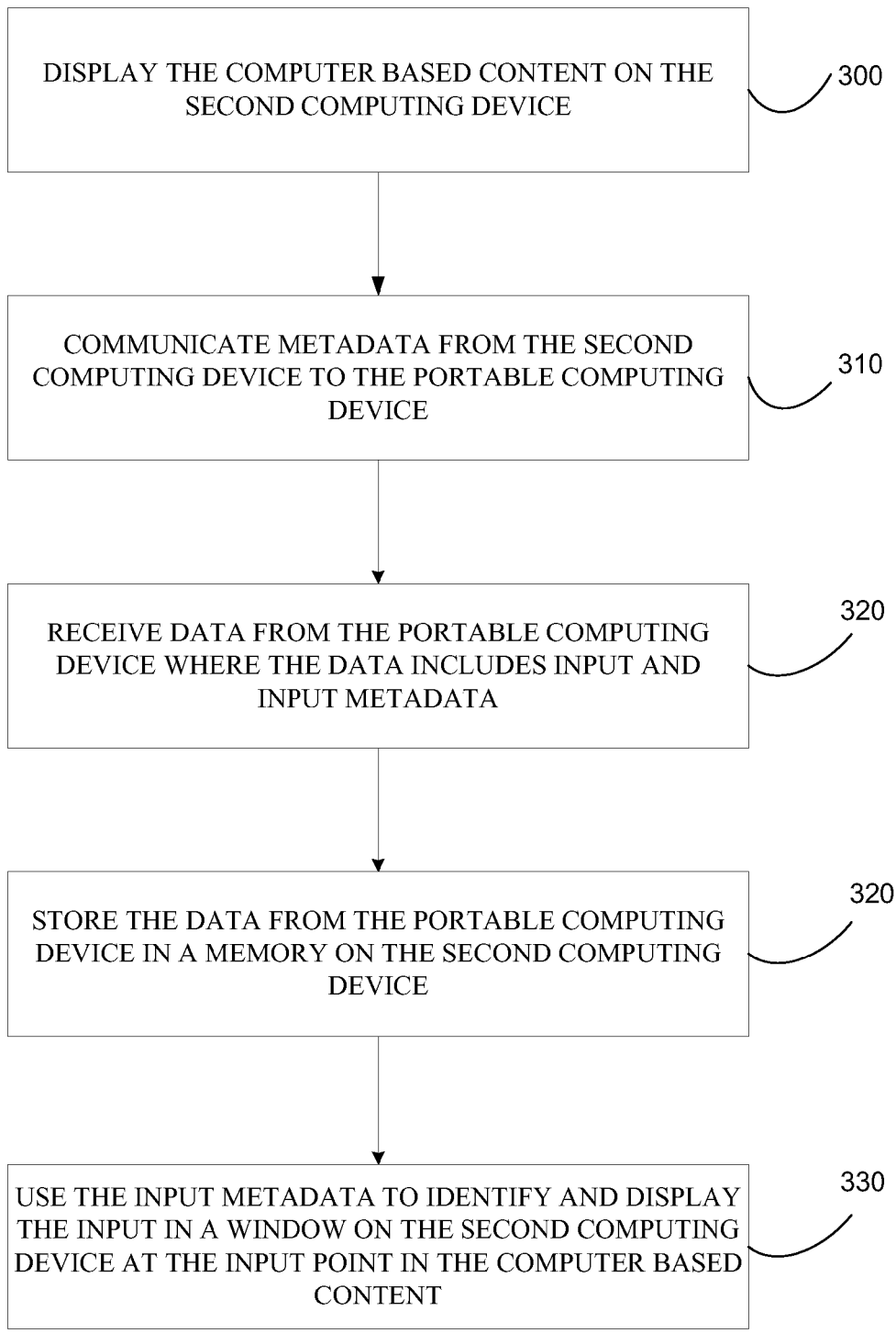
FIG. 3 is an illustration of a method of associating user input at an input point with computer based content displayed at the input point.

FIG. 3 is an illustration of a method of associating input on a portable computing device 100 with computer based content 405 (FIG. 4) on a second computing device 400. The portable computing device 100 may be a computing device such as the computing device in FIGS. 1 and 2 and the second computing device 400 may be like a traditional desktop computing device. Of course, the portable computing device 100 may be any computing device as can the computing device and are not limited by the labels "portable" or by the drawings in FIGS. 1 and 2. In one embodiment, the portable computing device 100 is a digitizing pad that accepts input and stores the input in a digital format. A user may write or draw on the digitizing input pad 110 and this portable input 410 may be stored as digital data.

At block 300, the computer based content 405 may be displayed on the second computing device 400. The computer based content 405 may be virtually any media that may be communicated to a user. By example and not limitation, the content 405 may be a video where a subject is taught or the content 405 may be interactive question and answer sessions. The computer based content 405 may be displayed with controls to stop, rewind, fast forward or pause the computer based content 405. The computer based content 405 may also be interactive in that it may pose questions to users and receive responses. In one embodiment, the communication is learning based content. The possibilities for computer based content 405 are virtually limitless.

At block 310, the second computing device 400 may communicate learning metadata to the portable computing device 100. Metadata is well know and may be described as being data about data. In this case, the data is related to the computer based communication content 405 data. The learning metadata may include metadata related to the computer based content 405. Some possible metadata may include a length of the computer based content 405, a list of topics in the computer based content 405, timing information on when each topic begins, an index of topics in the computer based content 405, answers to questions in the computer based content 405 and help files related to the computer based content 405. The metadata also may provide a set of rules about what is regards as proper response and proper notes and warnings may be given to users when these rules are broken.

At block 320 data may be received from the portable computing device 100. The data may include input 410 from the portable computing device 100. The input 410 may be virtually any input that can be converted into a digital format. For example and not limitation, the input 410 may comprise drawings, text, photos, time indications, location indications, audio files and video files. The input 410 also may be digitalized drawings from a portable computing device 100 with an input area 110 that accepts writings from a user. Of course, other inputs are possible and are contemplated.

The input 410 may be created at an input point. The input point may be a point of progress of the computer based content 405 at which the input was entered. For example, the input point may be a point in time in the computer based content 405. In another example, the input point may be a point of progress through a computer based content 405, such as the end of a topic or the start of a new topic. In yet another example, the input point may be the question after which the input 410 was entered. Of course, other ways to determine the input point are possible.

It should be noted that the input 410 may be created on the portable computing device 100. The portable computing device 100 may or may not be in communication with the second computing device 400. If the portable computing device 100 is in communication with the second computing device 400, the input 410 may be immediately communicated to the second computing device 400. If the portable computing device 100 is not in communication with the second computing device 400, the input 410 may be stored with input metadata in the portable computing device 100. The input metadata may include learning metadata related to the computer based content 405 being displayed at the input point. For example, the input metadata may include an input time at which the input was entered and later, the input time may be matched with the computer based content 405 to determine what was being shown at the input time. In another embodiment, the input point may be topic based such as how far into a topic the computer based content 405 was when the input was received. The input point may be matched with the topic in the computer based content 405 on the second computing device 400. Of course, other types and forms of metadata are possible and are contemplated.

At block 330, the data from the portable computing device 100 may be stored in a memory on the second computing device 400. As stated previously, the portable computing device 100 may be in communication with the second computing device 400 and the input 41 may be stored shortly after being entered. In other situations, the portable computing device 100 may not be in communication with the second computing device 400 in which case the input may be stored in a memory 210 in the portable computing device 100 until a time when communication is established between the portable computing device 100 and the second computing device 400 and then the data may be stored in the second computing device 400.

At block 340, the input metadata may be used to identify and display the input 410 in a window on the second computing device 400 at the input point in the computer based content 405. For example and not limitation, a user may have taken part in several computer based content 405 sessions before being able to communicate with the second computing device 400. The input metadata may be able to identify which computer based content 405 session the input 410 relates. In another situation, the metadata may identify the topic to which the input 410 is related. As metadata is data about data, the range of possible metadata forms and inclusions is virtually limitless.

Once the input metadata is received by the second computing device 400, it may be stored in a memory. The input metadata may then be analyzed to properly place the input data in the computer based content 405 at the appropriate location. Again, the general concept is that the input 410 will be displayed in a window 420 along side the computer based content 405 at point when the input was originally entered. The point may be a point in time (such as an elapsed time) or may be when a particular topic is discussed. In this way, a user may be reminded on notes or question that arose while watching a particular point in a computer based content 405.

In another embodiment, all the input 410 may be displayed in the separate window 420 at the start of the computer based content 405. When the input point in the computer based content 405 is reached, the input 410 may be highlighted or another cue, such as a visual cue, an audio cue or a tactile cue may notify a user that input 410 is available to be viewed related to the current point in the computer based content 405.

The input 410 that are displayed in the separate window 420 also may allow the input 410 to be selected. At this point, the input 410 may be opened in an appropriate editing application based on the input file type. For example, if the input 410 is handwriting, the input may be opened in Microsoft® Paint. If the input 410 is text, the input 410 may be opened in Microsoft® Word®. If the input 410 is sound or video, the input 410 maybe be opened in Microsoft® Media Player®. Once opened, the input 410 may be edited and the edited input 410 may be stored in place of the original input 410 or it may be stored in addition to the original input 410.

In addition, by selecting the input 410, the input point of the input 410 may be changed. For example, a user may watch computer based content 405 and make a note of a question. This input 410 in the form of a question would be stored along with input metadata indicating the input point. Later in the computer based content 405, the question may be answered. The user may then desire to select the input 410 and move it to an input point where the question is answered. Of course, any other location may be appropriate as desired by a user.

In another embodiment, selecting the input 410 will adjust the computer based content 405 to the input point. In this way, a user can move to the point in the computer based content 405 where the input 410 was added. In an example, a user could select an input 410 that is a question provoked by the computer based content 405 and the computer based content 405 may adjust to the input point. In this way, a user may be able to highlight areas of confusion in the computer based content 405 or areas that require additional review.

In some embodiments, a unique sign 450 in is required for each user of the computer based content 405. In this case, the input 410 for that user id 450 will be displayed, storing the input 410 received for the signed in user 450 and displaying the input 410 received from the signed in user 450 only from the signed in user 450. In some embodiments, the sign in 450 will not be necessary as the portable computing device may only communicate with a single second computing device 400. In other embodiments, multiple users may use the same computer based content 405 and users may desire to keep their input 410 private. In yet another embodiment, a supervisor such as a teacher may be able to review the input 410. In this way, a supervisor may be able to grasp users understanding of the material.

Figure 4:
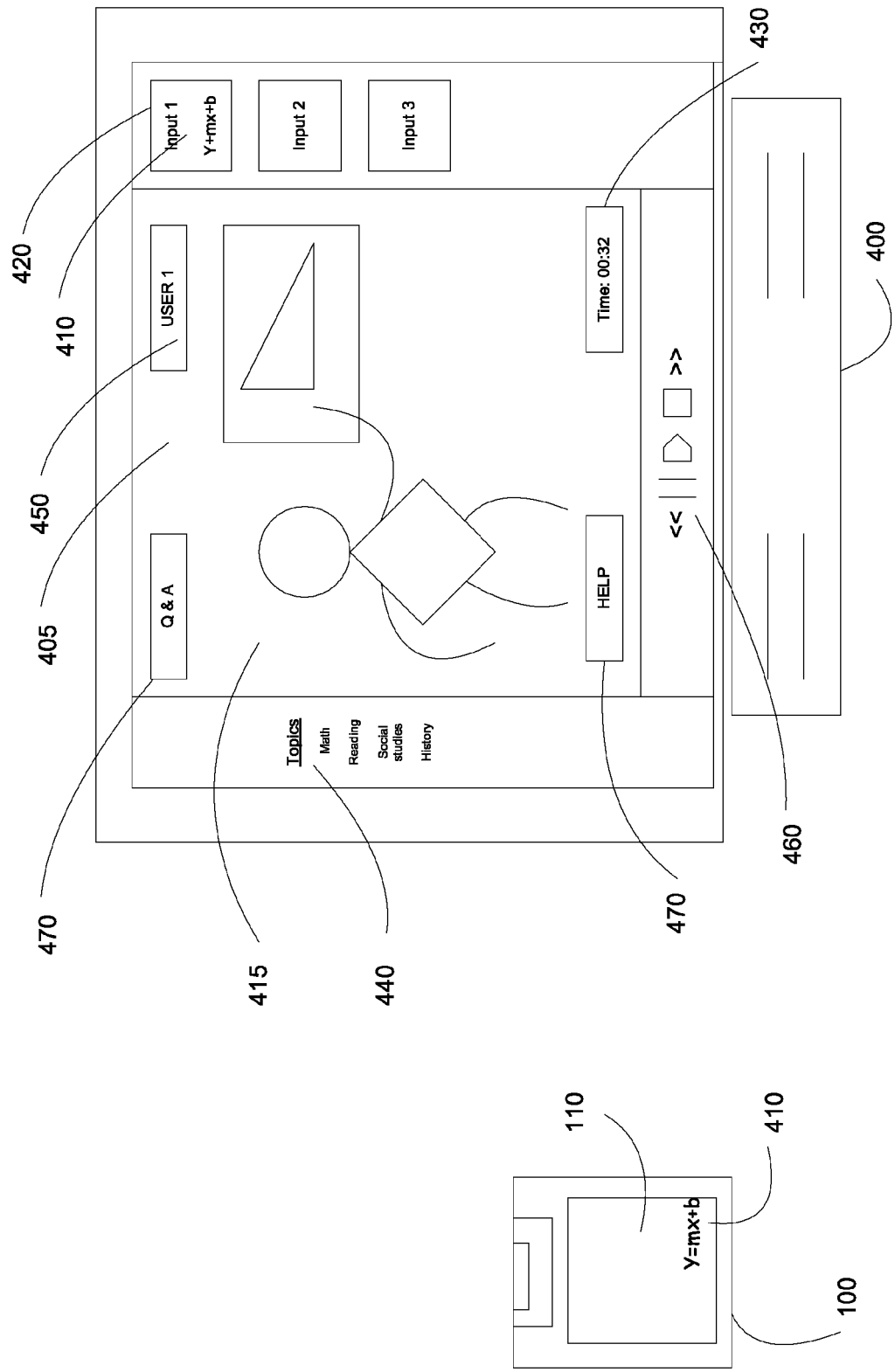
FIG. 4 is an illustration of a user interface of a portable computing device and a second computing device.

FIG. 4 illustrates a portable computing device 100 and a second computing device 400 with a user interface 415 to assist in transferring inputs 410 to the computer based content 405. The computer based content 405 may be displayed on the second computing device 400. In a separate window or area 420, the input 410 received from the portable computing device 100. As explained earlier, the input 410 may be displayed when the computer based content 405 reaches the input point or all the inputs 410 related to the computer based content 405 may be displayed. It is not necessary for the inputs 410 to be displayed in separate window. The inputs 410 may be noted in a variety of ways such as appearing as post it type notes at the input point in the computer based content 405 or being flashed briefly on the second computer 400 when the computer based content 405 is at the input point. The inputs 410 may be selected and additional detail of the input 410 may be displayed such as a large scale version of the input 410. In another option, the selected input 410 may be opened in an appropriate editing application based on the input type.

The user interface 415 also may display an elapsed time indication and a time left indication 430. In this way, a user may know how much time is left to complete a topic. In addition, a list of topics or an index 440 for the computer based content 405 may be displayed. The topic items 440 may be selected and the computer based content 405 may move to the topic selected. In some embodiments, user may sign in and the sign in name 450 may be displayed. Options to stop, rewind, fast forward, skip topics, repeat topics, pause and search 460 the computer based content 405 including input 410 may also be displayed. Help options 470 also may be selected and displayed 460. If questions and answers are part of the computer based content 405, the questions and answers session may be displayed along with a progress report.

It should be noted that all or part of the method may be accomplished solely on the portable computing device 100. For example, the portable computing device 100 may have a display 120, a processor 220 and a memory 210 which may be all that is required to perform the method. For example and not limitation, the content 405 may be shown on the display 120 of portable computing device 100 and the input 410 may be stored in the memory 210 and added to the content 405.

As a result of the method, user interface and system, notes and other input 410 may be entered directly onto computer based content 405. The notes 410 may be taken on a portable computing device 100 that contains metadata from the computer based content 405. The metadata and input 410 are stored and once the portable computing device 100 is in communication with the second computing device 400 displaying the computer based content 405, the input 410 is displayed near the computer based content 405 that was displayed at the time the input 410 was created. Users can select the input 410 and the computer based content 405 will adjust to the input point in the content 405 that was displayed when the input 410 was created. The input 410 may be edited or moved to another point in the computer based content 405.

The invention claimed is:

1. A method of associating input inputted on a touch-sensitive input area of a portable computing device with content of an application on a second computing device comprising:
    displaying the content on the second computing device;
    communicating learning metadata to the portable computing device wherein the learning metadata comprises metadata used by the mobile computing device to associate the input with the content of the application, the input comprising a hand-drawn graphic inputted in the touch-sensitive input area of the portable computing device;
    receiving data from the portable computing device wherein the data comprises:
        the input from the portable computing device at an input point wherein the input point comprises a point of progress of the content of the application; and
        input metadata relating the content of the application being displayed with the input point; and
    storing the data from the portable computing device in a memory on the second computing device; and
    using the input metadata to select the application and to display the input within the content in a window on the second computing device at the input point, and allowing the input to be selected, edited, and stored as edited input.

2. The method of claim 1, further comprising:
    on the second computing device, displaying the input as an option to be selected; and
    using the input metadata to display the content at the input point upon selection of the input.

3. The method of claim 1, wherein the input comprises either a drawing, text, photo, time indication, location indication, audio data, or video data.

4. The method of claim 1, wherein the input comprises digitalized hand-drawn drawings.

5. The method of claim 1, wherein the content comprises a file that containing the content such that the content may be stopped, rewound, fast forwarded and paused using the application.

6. The method of claim 1, wherein the learning metadata comprises data about the content and comprises either a length of the content, a topic in the content, timing information on when the topic begins, an index of topics in the content, or an answer to a question in the content.

7. The method of claim 1, further comprising using a unique sign-in for each of a plurality of users, storing the input received for a signed-in one of the users, and displaying the input received from the signed in user.

8. A user interface for associating input inputted on a portable computing device with content on a second computing device, the input having been inputted via a digitizing input area of the portable computing device that captures hand-drawn input, the user interface comprising:
    a first display area displaying the content on the second computing device; and
    a panel of the content displayed on the second computing device, the panel displaying the input as received from the portable computing device after the portable computing device has communicated with the second computing device, wherein the input is inserted into the content at an input point determined by metadata on the portable computing device, wherein the input point comprises a point of progress of the computer based content at which the input was entered and the input comprises a hand-drawn graphic; and
    an option display displaying the input as an option to be selected, wherein upon selection of the input, information related to the input is displayed.

9. The user interface of claim 8, wherein the input comprises digitalized drawing input.

10. The user interface of claim 8, further comprising
    an option display displayed responsive to connection of the portable computing device with the computer and allowing the input to be selected, wherein when the input is selected, an editing application is selected to display the input based on a data type of the input, then allowing the input to be edited and stored as edited input and replacing the input with the edited input.

11. The user interface of claim 8, wherein the content is displayed by an application that comprises stop, rewind, fast forward, and pause commands.

12. The user interface of claim 8, further comprising an index display displaying an index of topics in the content and allowing the topics to be selected.

13. A method of displaying hand-drawn graphics inputted on a mobile computing device within windows of arbitrary applications executing on a computer, the mobile computing device having a display and an input area by which the hand-drawn graphics are inputted, the method comprising:
    exchanging metadata between the mobile computing device and the computer;
    capturing a hand-drawn graphic when it is inputted in the input area by a person;
    establishing a connection between the mobile computing device and the computer;
    in response to the hand-drawn graphic being inputted on the input area, storing the hand-drawn graphic on the mobile computing device;
    communicating the stored hand-drawn graphic from the mobile computing device to the computer;
    receiving the hand-drawn graphic at the computer; and
    using the metadata to identify which of a plurality of applications on the computer the hand-drawn graphic is associated with and further using the metadata to determine a position of the hand-drawn graphic within user-editable content displayed by the identified application.

14. A method according to claim 13, wherein the hand-drawn graphic is inputted while the mobile computing device and the computer are connected, and responding to the hand-drawn-graphic having been inputted by sending the hand-drawn graphic from the mobile computing device to the computer, and the computer responds to receiving the hand-drawn graphic by displaying the hand-drawn graphic in a window displaying the content.

* * * * *